L. E. WATERMAN.
DISK PLOW.
APPLICATION FILED OCT. 22, 1914.
1,178,765.
Patented Apr. 11, 1916.
2 SHEETS—SHEET 1.
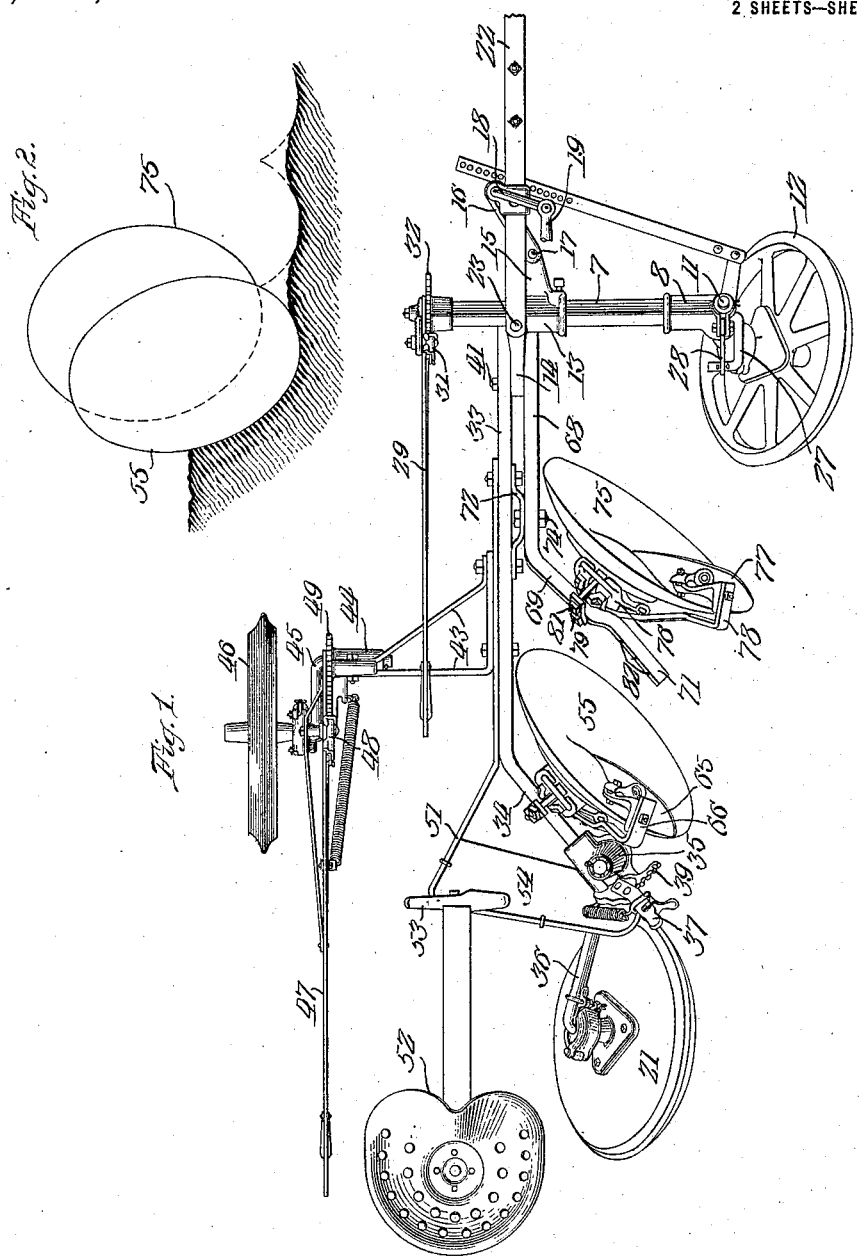

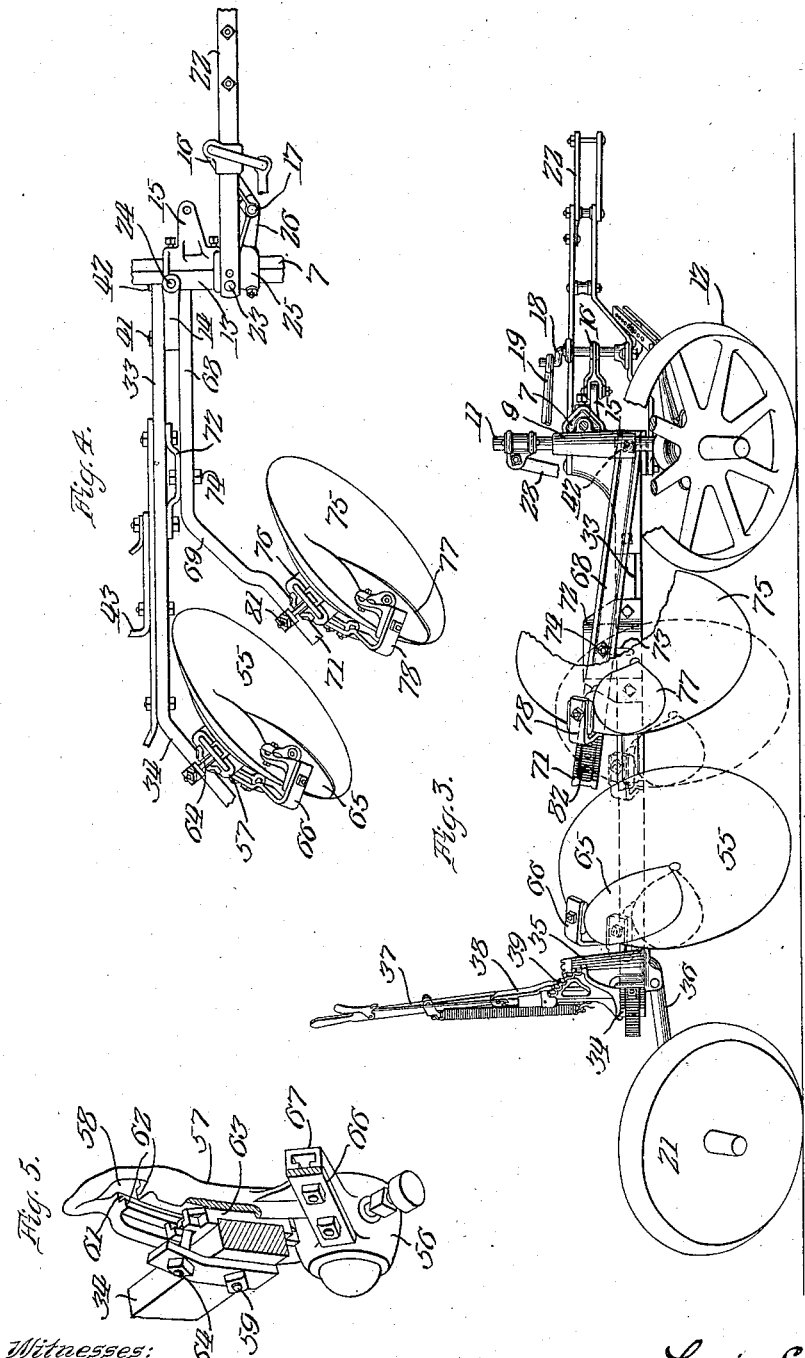

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

DISK PLOW.

1,178,765. Specification of Letters Patent. Patented Apr. 11, 1916.

Application filed October 22, 1914. Serial No. 868,091.

*To all whom it may concern:*

Be it known that I, LEWIS E. WATERMAN, a citizen of the United States, residing at Rockford, in the county of Winnebago and State of Illinois, have invented certain new and useful Improvements in Disk Plows, of which the following is a specification.

This invention relates in general to plows, and has more particular reference to that type of plows in which the soil is cut and turned by rotating disks, these plows being commonly known as disk plows.

Disk plows comprising a plurality of disks arranged in parallel relation and each to the land side of its preceding disk and all of the disks cutting to approximately the same depth have been in more or less extensive use for a long time, these plows being commonly known as gang plows. Disk plows comprising a plurality of disks arranged so that one disk will travel in the path of the other and increase the depth of cut made by the preceding disk have also been used for deep tillage purposes. The advantages of occasionally plowing the land to an unusual depth of from 12 to 16 inches in order to bring up new soil have been recognized for some time. Experimentation, however, has shown that the best results in crops are obtained not when the old soil is completely buried under the new soil brought up by a deep tillage plow but that the best results are secured by mixing a certain quantity of the old soil with the new so that the soil in which the crop is planted consists principally of the new soil brought up from a considerable depth mixed with a smaller quantity of the old soil which lay at or near the top of the ground before the ground was plowed.

One of the primary objects of my present invention is the provision of a plow which shall be adapted to bring to the surface new soil from any desired depth and which at the same time will mix with the new soil brought up, a desired amount of the old soil on the surface of the unplowed land. Since it is not necessary or desirable to plow the land to this unusual depth oftener than once in several years, a machine which is adapted for deep plowing only must necessarily lie idle a greater portion of the time while other plows must be kept and used for plowing to ordinary depths. The original investment in a deep tillage plow is entirely out of proportion to the frequency of its use and this fact together with the fact that other plows for ordinary plowing must be kept on hand has been one of the principal objections in the eyes of the farmers to the deep tillage plows.

Another object of my present invention is to provide a plow which can be used either as a deep tillage plow or as an ordinary gang plow and which can be readily and quickly converted from one type of plow to the other and which, when the conversion is made, will automatically position the disks in the proper relation and at the required angles to each other.

Another object of the invention is to provide a plow in which the rear disk shall be fixedly mounted so that no adjustment thereof is necessary, and to so mount the other disk that conversion of the plow from one type to another may be accomplished by adjustment of the front disk only.

Various other objects of this invention and many advantages thereof will be apparent as the invention becomes better understood by reference to the following description when considered in connection with the accompanying drawings.

Referring to the drawings—Figure 1 is a plan view of a disk plow embodying my invention, showing the adjustment of the parts for deep tillage plowing; Fig. 2 is a diagrammatic rear elevation of the two disks shown in Fig. 1 when in operative position in the ground; Fig. 3 is a side elevation of the plow shown in Fig. 1; Fig. 4 is a fragmentary plan view of the construction shown in Figs. 1 and 2 with the disks adjusted to operate as a gang plow; and Fig. 5 is a fragmentary perspective view of one of the disk mountings.

From an inspection of the drawings it will be observed that the front of the plow frame comprises a transversely extending angular member 7 upon one end of which is fixed a casting 8 providing a vertical bearing 9 in which a post 11 is mounted, the post being bent outwardly at its lower end to form the axle for the furrow wheel 12. A casting 13 mounted on the member 7 intermediate its ends is provided with a rearwardly extending portion 14, to which the plow beams are attached, and a forwardly extending portion 15 to which a link 16 is attached by a bolt 17, the forward end of this link being connected with a crank-shaped member 18 which in turn is connected by a rod 19 with the rear furrow wheel 21 by means of which said rear furrow wheel is guided. The specific connection between the rear furrow wheel and the rod 19 may be of any approved construction and, in order to not unnecessarily complicate the drawings, this connection is not shown in the present instance. The draft members 22 to which the horses, or a tractor if preferred, are attached, are connected with the plow frame by means of a bolt 23 which, when the plow is to be used as a deep tillage instrument, is inserted in an opening 24 in the casting 13, and when the plow is to be used as a gang plow, is inserted through an opening in an auxiliary casting 25 positioned upon the member 7 at the right of the casting 13, the member 25 being provided with a projection 26 to which the link 16 is connected when this hitch is employed.

A shaft carried by the member 7 is formed at one end to provide a crank 27 which is connected with the post 11 by means of a link 28 through which, when the crank is raised or lowered, the post 11 is correspondingly raised or lowered relatively to the frame to thereby lower or raise the front end of the frame to the required height. A hand lever 29 fixed to the opposite end of the shaft is provided with the customary manually controlled latch 31 adapted to engage with the teeth of a notched sector 32 mounted on the member 7 so that the lever may be manipulated to secure the desired vertical adjustment of the forward end of the frame, and the lever will be retained in adjusted position by the latch coöperating with the sector.

The main plow beam, which forms the longitudinal portion of the plow frame, comprises a longitudinally extending portion 33 and a diagonally disposed or laterally inclined portion 34 bolted at its rear end to a bearing casting 35 in which the upstanding portion of a crank-shaped member 36 is disposed, the rear end of said member being bent laterally to form the axle for the rear furrow wheel 21. An adjusting lever 37 secured to the member 36 is employed to vertically adjust the rear end of the plow frame which is held in adjusted position by engagement of a latch 38, of any improved construction, with the notches in a sector 39 fixed with respect to the main beam. The forward end of the main beam is rigidly connected to the rearward extension 14 of the casting 13 by means of bolts 41 and 42.

A laterally extending bracket 43, securely fastened to the land side of the main beam, carries at its outer extremity a bearing 44 adapted to receive the inner end of a crank-shaped member 45, the outer end of which forms the axle for the land wheel 46. A hand lever 47 connected with the member 45 is employed to raise and lower this side of the frame, which is held in adjusted position by engagement of another latch 48 with the notches of a toothed segment 49 fixed with respect to the bracket 43. Another bracket 51, securely bolted to the main beam, provides a support for the driver's seat 52, the foot rest 53 and the tool box 54.

The rear disk 55 is mounted upon the inclined portion 34 of the main beam by means of a bracket mounting, best shown in Fig. 5. The disk is concave on its forward face but has a convex forwardly projecting center to permit the disk to set well back over the bearing so that a long thrust bearing may be employed without causing the rear end of the bearing to project rearwardly so far beyond the disk that it would be liable to contact with and scrape along the land side wall of the furrow produced by the disk. The disk is fixed to and supported by a spindle rotatable in a box or journal 56 formed integrally with the bracket 57, best shown in Fig. 5. The rear face of the disk lies relatively close to the forward face of the bracket, so that when the disk is attached to the bracket it would be impossible to insert and tighten the fastening bolts by means of which the bracket is secured to the main beam. I have therefore shaped the bracket as shown in Fig. 5 to leave an opening 58 at its upper end through which the head of the fastening bolt 59 may be inserted and slid downwardly in the channel 61 formed between the opposed ribs 62.

Between the bracket 57 and the face of the main beam I interpose a block 63 slotted at its upper end to receive the fastening bolt 64. The bolt 59 passes through an opening in the inclined portion 34 of the main beam while the bolt 64 is disposed above the beam. The bracket is slightly curved longitudinally, as shown, and the front face of the block 63 is curved to conform to the curvature of the bracket. This construction permits vertical adjustment of the bracket and at the same time provides for variation in the angle of the disk relatively to the vertical. When the disk has been positioned to the desired depth and in the desired inclination the nuts on the bolts 59 and 61 are tightened up to securely clamp the bracket to the beam. A mold-board or scraper 65 is carried by the forward end of an arm 66 adjustably mounted on an extension 67 of the bracket. This scraper or mold-board, when the plow is set for deep tillage, is adjusted to substantially the position shown in Fig. 3, so that it throws the dirt upwardly and outwardly from the upper portion of the disk. When the plow is to be used as a gang plow the mold-board is adjusted to the position shown in dotted lines in Fig. 3. This position is preferable for the reason that the disk is not cutting so deep and it is not necessary or desirable that the dirt be carried upwardly as far on the disk before being discharged laterally.

The secondary or shorter beam comprises a longitudinally extending portion 68 pivotally connected at its forward end to the main beam by the bolt 42 and extending rearwardly parallel with the portion 33 of the main beam and having its rear end bent laterally to form the inclined portion 69 extending in the general direction of but non-parallel with the portion 34 of the main beam, and the portion 71 extending beyond the portion 39 parallel with the portion 34 of the main beam. A plate 72 provided with a slot 73 is bolted to the main beam and this plate by reason of its shape, as shown in Fig. 4, serves as a spacer to maintain the longitudinal portions of the beams in substantial parallelism. The secondary beam is adjustably connected to the main beam by means of a bolt 74 passed through the secondary beam and through the slot 73. It will be obvious that the rear end of the secondary beam may be adjusted vertically within the limits prescribed by the length of the slot 73 and may be held in its adjusted position by the bolt 74. The front disk 75 is mounted on a bracket 76 similar to the bracket 57 and is also equipped with a scraper or mold-board 77 carried by an arm 78 similar to the arm 66 carrying the mold-board 65. The disk 75 is securely fastened in adjusted position to the secondary beam by means of the bolts 79 and 81.

When the plow is to be used for deep tillage the disk 75 is carried by the inclined portion 69 of the secondary beam and the rear end of the beam is elevated so that the front disk does not cut as deeply as the rear disk. Since the portion 69 of the secondary beam makes a more acute angle with the line of draft than does the portion 34 of the main beam it will be obvious that the face of the disk 75 is disposed more nearly normal to the line of draft than the disk 55. This position of the disk is clearly illustrated in Fig. 1 while the relative depth of cut of the disks will be obvious from Fig. 3. The land side edge of the rear disk is disposed in proximity to the longitudinal portion of the main beam while the land side edge of the front disk is disposed in proximity to the longitudinal portion of the secondary beam. The rear disk therefore sets to the land side of the front disk a distance substantially equal to the width of the secondary beam plus the distance between the beams. In actual practice the rear disk is disposed approximately 3 inches to the land side of the front disk. It will be obvious, therefore, that the central draft line of the rear disk, that is, a line passing through the center of the disk parallel with the line of draft of the machine will pass through or intersect the preceding disk to the land side and below the center of said preceding disk. When the plow is in operation the disks will operate substantially as shown in Fig. 2, the front disk cutting and turning the major width of the furrow while the rear disk increases both the depth and width of the furrow. The soil turned by the front disk is delivered into the previously formed furrow while the soil removed by the rear disk from the bottom of the furrow produced by the front disk and the soil cut by the rear disk at the land side of the front disk are thoroughly mixed and delivered together by the rear disk on top of the soil turned by the front disk. It will thus be obvious that by means of this improved plow I obtain a surface layer of soil consisting of new soil from the bottom of the newly made furrow thoroughly mixed with soil taken from the land side of the front disk.

Whenever it may be desirable to convert the deep tillage plow into a gang plow the change may be quickly and easily effected by removing the nuts from the bolts 79 and 81, moving the front disk outwardly and securing it in position on the portion 71 of the secondary beam. The bolt 74 is also loosened and the rear end of the beam is lowered to bring the lower edge of the front disk into the horizontal plane of the lower edge of the rear disk, as shown in dotted lines in Fig. 3. The portion 71 of the secondary beam is provided with a series of holes 82 so that the disk may be set in various positions to cut the required width of furrow. Since the portion 71 of the secondary beam is parallel with the portion 34 of the main beam it will be apparent that the disks 55 and 77 will be parallel horizontally. The lowering of the rear end of the secondary beam about the pivot bolt 42 will also cause the front disk to automatically tilt rearwardly more than it did when the beam was in elevated position. The parts are so proportioned and arranged that when the secondary beam is lowered to convert the plow into a gang plow the disks will be parallel both horizontally and vertically. When, however, the front disk is elevated for deep tillage work it will be disposed more nearly perpendicular than the rear disk. These relative positions of the disks have been found to be proper for the work required.

It should be apparent from the foregoing that I have provided a plow which is capable of giving most satisfactory results either when used as a gang plow or a deep tillage plow; that it may be readily converted from one type to the other and that the act of converting the plow from a deep tillage to a gang, or vice versa, automatically positions the front disk in the required position both with respect to the vertical and with respect to the line of draft. The plow is simple, strong and durable in construction, is easy to manipulate, is of light draft, and is efficient in operation. The details of construction, shown for purposes of illustration, may obviously be varied within considerable limits without departing from the spirit of this invention or sacrificing any of its material advantages.

I claim:

1. A disk plow comprising a plurality of disks of substantially equal diameters positioned one rearwardly of another, the rear disk being set below and a limited distance to the land side of the preceding disk with its central draft line intersecting the preceding disk so that the rear disk deepens and widens the furrow produced by said preceding disk.

2. A disk plow comprising a plurality of disks of substantially the same size positioned one rearwardly of another so that each turns the soil cut thereby independently of the other, the land side and bottom edges of the rear disk being respectively disposed to the land side and below the corresponding edges of the preceding disk with the center draft line of the rear disk intersected by the preceding disk so that the rear disk is adapted to widen and deepen the furrow produced by the preceding disk.

3. In a disk plow, the combination of a main beam having a diagonally disposed portion, a disk mounted on said diagonal portion, a secondary beam pivoted to the forward end of said main beam so as to be capable of adjustment in a vertical plane, said secondary beam having a diagonally disposed portion positioned forwardly of the diagonal portion of the main beam, a disk mounted on the diagonal portion of the secondary beam and means for maintaining said secondary beam in adjusted position with respect to said main beam.

4. In a disk plow, the combination of a main beam having its rear portion disposed at an angle to the line of draft of the plow, a secondary beam mounted at one side of said main beam and having its rear end also disposed at an angle to the line of draft of the plow, means for pivotally connecting said beams together at their forward ends, an adjustable connection between said beams intermediate their ends permitting adjustment of the rear end of said secondary beam relatively to the main beam in a vertical plane, and a disk mounted on the inclined portion of each of said beams.

5. In a disk plow, the combination of a main beam having a longitudinally extending portion and a laterally inclined portion, a secondary beam having a longitudinally extending portion parallel with the corresponding portion of the main beam and an inclined portion non-parallel with the inclined portion of the main beam, means for supporting the secondary beam so as to permit vertical adjustment thereof relatively to the main beam, and a disk carried by each of said beams.

6. In a disk plow, the combination of a main beam comprising a longitudinal portion and a laterally inclined portion, a secondary beam comprising a longitudinal portion, a laterally inclined portion non-parallel with the inclined portion of the main beam, and a laterally inclined portion parallel with the inclined portion of the main beam, a plurality of disks, means for securing one of said disks on the inclined portion of the main beam, and means for securing the other disk to either the parallel or non-parallel portions of the secondary beam.

7. In a disk plow, the combination of a main beam comprising a longitudinal portion terminating at its rear end in a laterally inclined portion, a secondary beam comprising a longitudinal portion disposed substantially parallel with the longitudinal portion of the main beam, a portion extending laterally from said longitudinal portion in the general direction of the laterally extending portion of the main beam but not parallel therewith, said secondary portion terminating at its rear end in a laterally extending portion parallel with the laterally extending portion of the main beam, means for pivotally connecting the longitudinal portions of said beams together at their forward ends, and a bolt and slot connection between said beams intermediate their ends permitting vertical adjustment of the rear end of the secondary beam relatively to the main beam.

8. In a disk plow, the combination of a main beam, a disk mounted thereon, a secondary beam pivotally mounted at its forward end, a disk carried by said secondary beam, and means for adjustably supporting the rear end of said secondary beam comprising an adjustable connection between the main beam and the rear portion of the secondary beam so that said secondary beam may be raised and lowered with respect to the main beam to vary the depth of cut of the disk carried by the secondary beam and also to vary the inclination of said disk.

9. In a disk plow, the combination of a main beam comprising a longitudinally extending portion and a laterally inclined portion, a secondary beam shorter than the main beam and also comprising a longitudinal portion and a laterally inclined portion, means for pivotally connecting the forward ends of said beams, a bolt and slot connection between the beams intermediate their ends permitting a vertical adjustment of the secondary beam relatively to the main beam, a disk fixedly mounted on the inclined portion of the main beam, and a second disk adjustably mounted on the inclined portion of said secondary beam so as to be capable of adjustment toward and from the longitudinal portions of said beams.

10. In a disk plow, the combination of a main beam, a disk rotatably mounted thereon, a secondary beam, means for adjusting the rear end of said secondary beam vertically with respect to the main beam, a disk for said secondary beam, and means whereby said disk may be adjusted on the secondary beam into parallel and non-parallel relations with the disk on said main beam.

11. In a disk plow, the combination of a disk for producing a furrow and a disk of substantially the same diameter mounted to overlap said first disk and disposed rearwardly below and to the land side of said first disk with its center draft line intersecting the first disk so as to cut new soil from the bottom of said furrow and old soil from the land side of said furrow, mixing the soil so cut and depositing said mixed soil upon the surface of the soil turned by said first mentioned disk.

LEWIS E. WATERMAN.

Witnesses:
G. R. MILLER,
N. F. LEVINGS.

Copies of this patent may be obtained for five cents each, by addressing the "Commissioner of Patents, Washington, D. C."